Jan. 6, 1953     D. F. BOWMAN     2,624,781

MEASURING SYSTEM

Filed July 1, 1949

INVENTOR
David F. Bowman
BY
Curtis, Morris & Safford
ATTORNEYS

Patented Jan. 6, 1953

2,624,781

UNITED STATES PATENT OFFICE 2,624,781

MEASURING SYSTEM

David F. Bowman, Mineola, N. Y., assignor, by mesne assignments, to Hewlett-Packard Company, Palo Alto, Calif., a corporation of California Application July 1, 1949, Serial No. 102,517

11 Claims. (Cl. 175—183)

This invention relates to systems for determining the impedance characteristics of electrical components or circuits, and more particularly to a null-type instrument for performing such measurements quickly and accurately.

The invention is in the nature of an improvement upon the measuring system described by John F. Byrne in U. S. patent application Serial No. 64,871, filed December 11, 1948.

The magnitude of the impedance at a point in a circuit can be obtained by applying a signal at that point and measuring the ratio of the voltage and current. In addition, the phase angle of the impedance can be determined by measuring, at the same point, the phase of the current with respect to the applied voltage. Accordingly, the impedance can be determined by examining voltage-current relationships at one point in a circuit. These measurements can be made conveniently at a point on a transmission line that extends from the signal source to the load circuit, the impedance of which is to be measured, and preferably are made at a point near the load circuit in order to simplify or eliminate subsequent calculations.

In order to obtain the desired data, two signals are derived from this main transmission line, preferably at the same point, the point of reference; one of these signals is a function of the magnitude of the voltage on the main transmission line at the reference point, and the other is a function of the magnitude of the current at the point of reference. The absolute values of these two signals are difficult to measure, but their ratio can be determined by measuring the amount by which one of the signals must be attenuated in order to be equal in value to the other. This determination establishes the magnitude of the impedance.

It is convenient to utilize the two signals after they have been equalized in value to determine the phase angle of the impedance. If the attenuation is accomplished without changing the relative phase of the signals, the derived signals can be made to have the same phase difference as the current and voltage on the main transmission line. By transmitting the signals in opposite directions along a reflectionless transmission line, a point may be found on these lines where the phase of the two voltages is opposite. The difference in the distances travelled by the signals from the main transmission line to this point will then provide a basis for determining the phase angle of the impedance, provided the frequency of the signal is known.

Accordingly, in applying the present invention, a first auxiliary current, the magnitude of which is a function of the current at the measuring point at which the impedance is to be determined, is induced in an auxiliary transmission channel; and a second auxiliary current, the magnitude of which is a function of the voltage at the point of measurement, is induced in the same transmission channel, but flows in the opposite direction from the first current. The impedance at the measuring point is then determined by measurements directed to these two currents in the auxiliary transmission channel. In one aspect, the invention is directed to the use of a single channel for carrying both of these auxiliary signals. In another aspect, it is directed to simplifying the construction and increasing the accuracy of the measuring instrument. In still another aspect, the invention is directed to the maintenance of constant sensitivity over the entire operating frequency range. These and other aspects, advantages, and objects of the invention will be apparent from a consideration of the following description taken in conjunction with the accompanying drawings in which:

Figure 1:
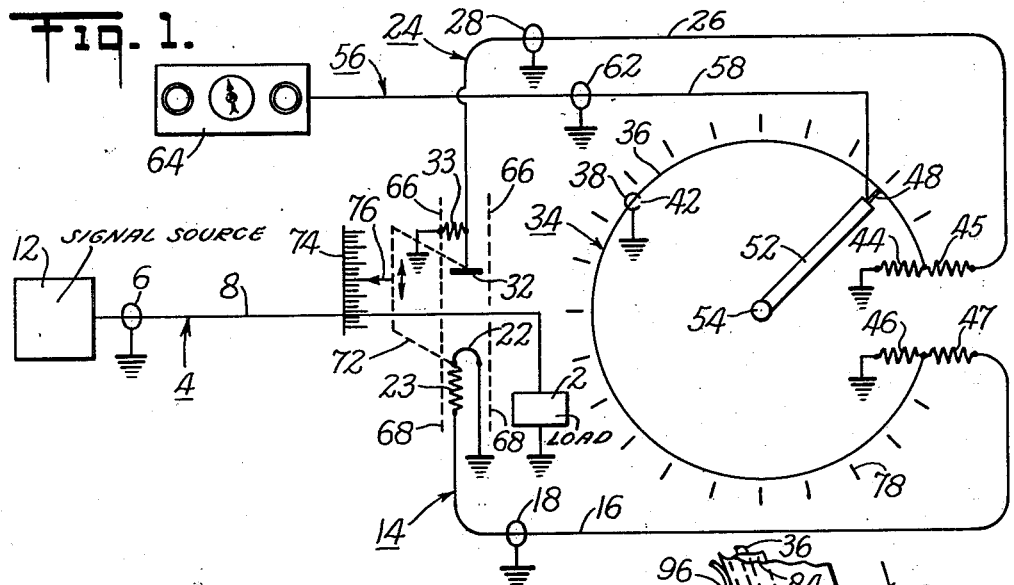
Fig. 1 shows, diagrammatically, an impedance measuring system embodying the invention.

In the diagrammatic arrangement of Fig. 1, a load 2, which represents an electrical circuit or element, the impedance of which is to be measured, is connected to one end of a main transmission line, for example, a coaxial line, generally indicated at 4, having an outer conductor 6 and an inner conductor 8. The opposite end of this line is connected to a signal generator 12, which provides a signal of the frequency at which the impedance measurement is to be made. At one point, called the reference point, along the line 4, an auxiliary coaxial line, generally indicated at 14, and having an inner conductor 16 and an outer conductor 18, is coupled to the coaxial line 4. In order that the signal on line 14 will be a function of the current on the main line 4 at the point of reference, inductive coupling is utilized, accomplished by means of a small loop 22 positioned to couple to the inner conductor 8 of the line 4. For impedance matching purposes, as will be explained below, a resistance 23 is connected in series with loop 22.

A second auxiliary line, generally indicated at 24, which, as will be shown later, is the opposite end-portion of a continuous transmission channel extending from line 14, having an inner conductor 26 and an outer conductor 28, is coupled to the coaxial transmission line 4, conveniently at a point adjacent loop 22. In order that the signal on line 24 will be a function of the voltage on the main line 4 at the point of reference, this coupling is accomplished by electrostatic means, for example, by means of a small disc-like probe 32 arranged to couple capacitively to line 4. A resistance 33 is connected in shunt with probe to provide a termination for line 24.

The opposite ends of these line portions 14 and 24 are connected to opposite ends of a coaxial transmission line, generally indicated at 34, and rigidly supported around an arcuate path, which has an inner conductor 36 and an outer conductor 38 that is provided with a longitudinal slot 42 (see also Figure 3) which extends along this arcuate line-portion 34.

Thus, the current induced in line 14 by the pick-up loop 22 flows clockwise along line 34, as viewed in Figure 1, and the current induced in line 24 by the capacity probe 32 flows in the opposite direction, that is, counter-clockwise, along the line 34; one of these currents is a function of the voltage on the main line 4 at the point of reference and the other is a function of the current at the point of reference.

In practice it is not always convenient to make the characteristic impedance of the slotted line 34 exactly equal to that of lines 14 and 24. In order to prevent the reflection of energy along the slotted line 34 which would be caused by such discontinuities, suitable terminating networks are employed. At the junction of lines 24 and 34 a terminating resistance 44 is connected between the inner and outer conductors of the lines, and an isolating resistance 45 is connected in series with line 24. A similar terminating resistor 46, at the junctions of lines 14 and 34, is also connected between the inner and outer conductors of the lines, and a second isolating resistance 47 is connected in series with line 14. These resistors are for the purpose of preventing reflection of energy at the ends of line 34. The values of these resistors, considered in each case in conjunction with resistance 23 or 33, are such that there is no substantial reflection of energy which has traversed the arcuate line-portion 34. For example, the resistances 23 and 33 can have values approximately equal to the characteristic impedance of the lines, and resistances 44 and 45, and 46 and 47, can be selected in accordance with the equation:

$$Z_{34} = \frac{R_{44}(R_{45}+Z_{24})}{R_{44}+R_{45}+Z_{24}} = \frac{R_{46}(R_{47}+Z_{14})}{R_{46}+R_{47}+Z_{14}}$$

Where R represents the value of the correspondingly numered resistance and Z represents the characteristic impedance of the correspondingly numbered line-portions 14, 24, and 34. Other types of terminating networks are known and can be employed, the primary requirement being to prevent any substantial flow of reflected energy on line 34.

If the magnitudes of the two currents induced in lines 14 and 24 are equal, then at some point on the line 34, which should be at least one-half wave-length long at the frequency of operation, the opposing currents will be exactly out-of-phase and, being equal in magnitude, will cancel and no signal will appear at that point on the line. The position of this point will depend upon the relative phase of the two currents that are induced in lines 14 and 24.

In order to determine the point along line 34 where the signal is a minimum, a probe 48 (see also Figures 2 and 3) is positioned to extend into slot 42 in the outer conductor 38 of line 34. This probe is supported by a radial arm 52, which is pivotally mounted for rotation about a point 54 at the center of the circle defined by the arcuately positioned line 34. The probe 48 is connected by means of a coaxial line, generally indicated at 56, and having an inner conductor 58 and an outer conductor 62, to a null-indicating device 64.

The null indicator 64 may be any device that will indicate the relative magnitude of a signal at the frequency of operation, and for example, may be a conventional radio receiver having an output meter for indicating the signal strength, or the signal applied to the main transmission line may be modulated with an audio voltage so that the null condition can be observed by listening for an audible signal from the loud speaker of the radio receiver.

As pointed out above, it is not necessary to determine the actual magnitudes of the currents in the transmission line 34, but only to ascertain the ratio of the magnitudes of these currents. This is accomplished in the present embodiment by attenuating one or both of the currents so that the two currents are equal in magnitude, and measuring the relative attenuation of the signals necessary to bring about this condition.

This is most conveniently accomplished by means of piston-type attenuators, in which loop 22 and capacity probe 32 form the movable elements, the outer conductors of the piston-attenuators being represented, respectively, by the broken lines at 66 and 68. These attenuators are ganged together by a suitable mechanism, indicated by the broken line 72, so that as the coupling on one of the auxiliary lines 14 and 24 is increased, the coupling of the other line is decreased. Because the laws of attenuation of such simple piston attenuators are known, or can be measured, a calibration can be provided for indicating the magnitude of the ratio of voltage and current on line 4 at the point of reference. Thus, if the position of ganging mechanism 72 is adjusted in each instance so that the currents travelling in opposite directions on line 34 are equal, a scale 74, which cooperates with a pointer 76, can be calibrated directly in terms of the magnitude of the impedance of line 4 at the point of reference.

In operation, the position of the ganging mechanism 72 and the angular position of arm 52 are adjusted alternately to reduce progressively the intensity of the signal picked up by the probe 48, as denoted by the null-indicating device 64. When these adjustments have been completed so that the minimum signal is picked up by probe 48, the pointer 76 will denote on scale 74 the magnitude of the impedance at the point of reference on line 4, and the angular position of arm 52 will indicate the phase angle of this impedance. The phase angle is determined by noting the position of arm 52, at balance, with respect to suitable scale marks 78, which are inscribed adjacent the line 34.

It is apparent that the calibrations on scale 78 will be a function of the applied frequency. However, this is no serious matter because the scale can be calibrated at a convenient frequency and a scale-multiplying factor used in accordance with the actual frequency of operation. These scale marks may be calibrated, for example, at 100 megacycles, so that a proportionality factor can be readily established for use at other frequencies. Thus, if such a bridge were used at a frequency of 253 megacycles, it would be necessary only to multiply the readings obtained from scale 78, by a factor of 2.53 to obtain directly the impedance angle of the load circuit. It is also apparent that by means of simple open and short-circuit tests, substituted for the load, that the positive and negative 90 degree marks on the calibrated scale 78 can be checked readily for accuracy.

For convenience in using the equipment and so that the impedance measuring portion of the system can be utilized with the greatest flexibility, the signal generator and null-indicator are connected by flexible coaxial conductors. To this end, the impedance measuring portion of the system is constructed advantageously as a separate unit, and a conventional type coaxial connector provided on the front of the case so that a suitable signal generator can be connected readily to the unit. In order that the distance between the point of reference, and the load circuit may be short, the attenuators are placed near the front panel of the case, where the main transmission line is connected to a conventional coaxial connector to which the load circuit is to be connected.

It is apparent that the usual precautions in designing null-balancing equipment should be observed and stray pick-up which would interfere with obtaining an accurate null must be substantially eliminated.

Figure 2:
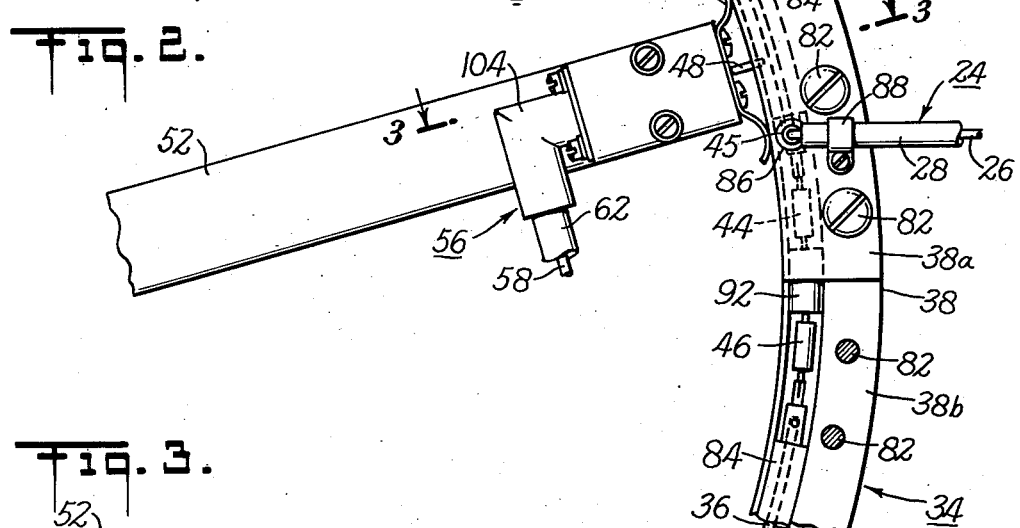
Fig. 2 shows a portion of the slotted auxiliary line and the pick-up probe which is utilized for detecting the null position on this line, a portion of the auxiliary line being removed to show the terminating element and connecting arrangement for this line.
Figure 3:
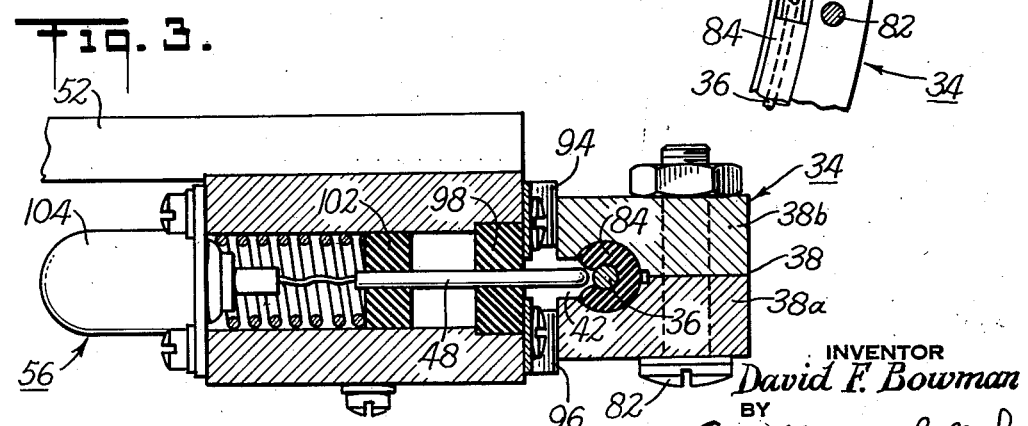
Fig. 3 is an enlarged sectional view taken along line 3—3 of Fig. 2.

Figures 2 and 3 show further details of the mechanical construction of line 34 and the assembly of arm 52. The outer conductor 38 of line 34 is formed of two annular metal blocks 38a and 38b which are held together by bolts 82, which are suitably spaced along the line 34. The blocks 38a and 38b are grooved longitudinally to house a length of tubular insulating material 84, in which is centered the inner conductor 36. The insulating material 84 and the blocks 38a and 38b are slotted longitudinally to form the opening 42 for the probe 48.

At one end of line 34, a vertical opening 86 (Fig. 2) is provided in the block 38a in which is mounted the resistor 45 which couples the inner conductor 36 of line 34 to inner conductor 26 of line 24. The outer conductor 28 of line 24 is joined to the outer conductor 38 of line 34, by means of a metallic strip 88, which is secured to the annular block 38a. The terminating resistor 44 is positioned between the blocks 38a and 38b, in order to simplify the construction and provide adequate shielding; one end of resistor 44 being connected to the inner conductor 36 and the opposite end being connected to a metal plug 92, which forms a good electrical contact with the members 38a and 38b. The other end of the line 34 is connected to line 14 in a similar manner with the terminating resistor 46 connected to the opposite end of block 92.

In order to provide a good electrical connection between the arm 52 and the outer conductor 38 of line 34, two sliding spring contacts 94 and 96 are connected to the end of arm 52 and positioned to slide on the inner surfaces of the annular members 38a and 38b, respectively.

The probe 48 is supported by two blocks 98 and 102 of insulating material and is connected through an elbow 104 to the inner conductor 58 of the null-indicator transmission line 56. The outer conductor 62 of this line is connected to the outer conductor 38 of line 34 by means of the sliding spring connectors 94 and 96.

Much of the construction of the above-described apparatus can be similar or identical with that described in the above-mentioned Byrne application. For example, the entire coupling assembly including the transmission line 4, and the piston-type attenuators together with the ganging and adjusting assembly, may be identical with that described in the above-mentioned application. In actual operation the system is manipulated in the same manner as the one described in that application.

However, the present arrangement provides several advantages over the Byrne system. For example, a single auxiliary line is used for carrying both auxiliary currents so that only a single probe is required for coupling energy to the null-indicating device 64, thus, obviating the need for the precision construction and positioning of two symmetrical probe structures. Another advantage of this arrangement is that when the system is in balance, with probe 48 at the null position, the probe 48 does not extract energy from the line 34, so that the probe causes minimum interference with the uniform characteristics of the line 34.

Another advantage of the present arrangement over the Byrne system is that the single line construction using only a single pick-up probe results in a more nearly constant sensitivity throughout the measuring range.

From the foregoing, it will be observed that the impedance measuring device embodying my invention is well adapted to obtain the ends and objects hereinbefore set forth, and in particular to be economically manufactured since the separate features are well suited to common production methods. The apparatus is of course subject to a variety of modifications as may be desirable in adapting the invention to different applications and manufacturing techniques. For example, the transmission channels can assume the form of wave guides or other structures that will conduct electrical energy along the desired paths, and various types of attenuators can be utilized to replace the piston-type attenuators. Accordingly, it is to be understood that the system described herein is to be considered as illustrative of the invention and not in a limiting sense.

I claim:

1. In an electrical measuring system, the combination comprising a first transmission channel adapted to be coupled to a source of alternating current energy and to a load circuit, a second transmission channel having one portion magnetically coupled to said first transmission channel and another portion electrostatically coupled to said main transmission channel, reflection-preventing means coupled to said second transmission channel to substantially eliminate reflected energy from at least a perdetermined portion thereof, at least one attenuator coupled to said second channel for equalizing the relative magnitudes of the currents induced in said second transmission channel by said electromagnetic and electrostatic coupling, and means for determining the point on said predetermined portion of said second transmission channel where said currents have a predetermined phase relationship.

2. In a system for measuring impedance, the combination comprising a main transmission line having one end connectible to a load circuit, the impedance of which is to be measured, and a second end connectible to an alternating current source, an auxiliary transmission line having one end magnetically coupled to said main transmission line and the opposite end electrostatically coupled to said main transmission line, terminating means coupled to said auxiliary line for eliminating standing waves from at least a portion of said auxiliary line, at least one attenuator coupled to said auxiliary line for varying the magnitude of at least one of the currents induced in said auxiliary line by said coupling, pick-up means coupled to said auxiliary transmission line and movable longitudinally therealong, and means coupled to said pick-up means for denoting the relative magnitude of the signal induced in said pick-up means.

3. A measuring system as claimed in claim 2 wherein the portion of said auxiliary transmission line that is traversed by said pick-up means forms a circular arc.

4. A measuring system as claimed in claim 2 wherein said attenuator comprises a manually-adjustable piston type attenuator.

5. In a system for measuring impedance, the combination comprising a main transmission line having one end connectible to a load circuit, the impedance of which is to be measured, and a second end connectible to an alternating current source, an auxiliary transmission line having one end magnetically coupled to said main transmission line and the opposite end electrostatically coupled to said main transmission line for inducing in said auxiliary line first and second oppositely flowing currents, terminating means coupled to said auxiliary line so as to eliminate substantially reflected energy from at least a portion of said auxiliary line, first and second attenuators coupled to said auxiliary line for varying the magnitudes of said first and second currents, respectively, pick-up means responsive to said currents and movable longitudinally along said auxiliary transmission line, and means under the control of said pick-up means for denoting when the magnitude of the signal induced in said pick-up means is a minimum.

6. In a system for measuring impedance, the combination comprising a main transmission line having one end connectible to a load circuit, the impedance of which is to be measured, and a second end connectible to an alternating current source, an auxiliary transmission line having one end magnetically coupled to said main transmission line and the opposite end electrostatically coupled to said main transmission line for inducing first and second oppositely flowing currents in said auxiliary line, first and second attenuators coupled to said auxiliary line for varying the magnitudes of said first and second currents, respectively, gang control means for simultaneously increasing the attenuation of one of said attenuators and decreasing the attenuation of the other, pick-up means coupled to said auxiliary transmission line and movable longitudinally therealong, and means for denoting the relative magnitude of the signal induced in said pick-up means.

7. A measuring system as claimed in claim 6 wherein said auxiliary transmission line comprises a coaxial line having an inner and outer conductor, said outer conductor having a longitudinal slot therealong, and said pick-up means includes a probe extending through said slot into said coaxial line.

8. In a system for measuring impedance, the combination comprising a main transmission line having one end connectible to a load circuit the impedance of which is to be measured and a second end connectible to a high frequency alternating current source, an auxiliary transmission line having one end magnetically coupled to said main transmission line and the opposite end electrostatically coupled to said main transmission line for inducing first and second oppositely flowing currents in said auxiliary line, first and second resistance networks connected to said auxiliary line at spaced positions for eliminating standing waves from that portion of the auxiliary line therebetween, first and second attenuators coupled to said auxiliary line and arranged to vary the magnitudes of said first and second currents, respectively, gang control means for simultaneously increasing the attenuation of one of said attenuators and decreasing the attenuation of the other, a pick-up probe coupled to said auxiliary transmission line between said resistance networks and movable longitudinally therealong, and a null-indicator for denoting the relative magnitude of the signal induced in said pick-up means.

9. In a system for measuring impedance, the combination comprising a main coaxial transmission line having one end connectible to a load circuit the impedance of which is to be measured and a second end connectible to an alternating current source, an auxiliary coaxial transmission line having one end magnetically coupled to said main transmission line and the opposite end electrostatically coupled to said main transmission line for inducing in said auxiliary line first and second oppositely flowing currents, said auxiliary line having spaced resistance networks for eliminating reflected waves from the portion of said auxiliary line between said networks, said last-said portion of said auxiliary line having a longitudinal slot in the outer conductor thereof and being positioned to form a circular arc, first and second attenuators coupled to opposite ends of said auxiliary line and arranged to vary the magnitudes of said first and second currents, respectively, a pick-up probe extending into said slot and responsive to said currents and movable longitudinally along said auxiliary transmission line, and a null indicator for denoting when the magnitude of the signal induced in said pick-up means is a minimum.

10. In a system for measuring impedance, the combination comprising a main coaxial transmission line having one end connectible to a load circuit the impedance of which is to be measured and a second end connectible to an alternating current source, an auxiliary coaxial transmission line having at one end a loop for magnetically coupling to said main transmission line and at the opposite end a disc for electrostatically coupling to said main transmission line for inducing in said auxiliary line first and second oppositely flowing currents, said auxiliary line having spaced shunt and series resistance elements for eliminating reflected waves from the portion of said auxiliary line between said elements, said last-said portion of said auxiliary line having a longitudinal slot in the outer conductor thereof and being positioned to form a circular arc, first and second adjustable piston-type attenuators connected respectively to said loop and to said disc and arranged to vary the magnitudes of said first and second currents, respectively, a scale, an indicator under control of said attenuators and cooperating with said scale to denote the relative attenuation of said currents, a pick-up probe extending into said slot and responsive to said currents and movable along an arc so as to traverse said slot, and a null indicator for denoting when the magnitude of the signal induced in said pick-up means is a minimum.

11. An impedance measuring system comprising a source of radio frequency energy, a load circuit, a first coaxial transmission line connecting said source to said load, a second coaxial transmission line having first, second, and third portions, at least a part of said third portion being positioned to form an arc of a circle and having a longitudinal slot through the outer conductor theerof, a disc-like voltage responsive probe coupled to said first portion of said second line and to said first line, a loop-like current responsive probe coupled to said second portion of said second line and to said first line, a manually-operable control for simultaneously adjusting the coupling between said first line and said first and second portions of said second line, a pick-up probe extending through said slot of said third portion, an arm for supporting said pick-up probe, said arm being pivotally mounted for rotation about the center of said circle so as to permit movement of said pick-up probe along said slot, a null indicator for denoting minimum radio frequency energy, and a third transmission line coupling said probe to said null indicator.

DAVID F. BOWMAN.

REFERENCES CITED

The following references are of record in the file of this patent:

UNITED STATES PATENTS

| Number | Name | Date |
|---|---|---|
| 2,314,764 | Brown | Mar. 23, 1943 |
| 2,337,934 | Scheldorf | Dec. 28, 1943 |
| 2,400,597 | Peterson | May 21, 1946 |
| 2,442,606 | Korman | June 1, 1948 |
| 2,456,800 | Taylor et al. | Dec. 21, 1948 |

OTHER REFERENCES

Morrison et al.: Proc. of I. R. E., vol. 36, February 1948, pages 212–216.

Proc. of I. R. E., vol. 36, No. 12, December 1948, pages 1493–1499.